(12) United States Patent
Geoffrion et al.

(10) Patent No.: US 9,405,298 B2
(45) Date of Patent: Aug. 2, 2016

(54) SYSTEM AND METHOD TO DIVIDE FLUID FLOW IN A PREDETERMINED RATIO

(75) Inventors: Bruno Geoffrion, Sunnyvale, CA (US); Mark Adam Crocket, Cupertino, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 1781 days.

(21) Appl. No.: 11/561,864

(22) Filed: Nov. 20, 2006

(65) Prior Publication Data

US 2008/0115834 A1  May 22, 2008

(51) Int. Cl.
*G05D 11/13* (2006.01)

(52) U.S. Cl.
CPC ......... *G05D 11/132* (2013.01); *Y10T 137/0363* (2015.04); *Y10T 137/8729* (2015.04); *Y10T 137/87249* (2015.04); *Y10T 137/87298* (2015.04)

(58) Field of Classification Search
CPC ........... G05D 11/132; Y10T 137/0363; Y10T 137/87249; Y10T 137/87298; Y10T 137/8729
USPC ......... 137/9, 579, 485, 487.5, 599.04, 599.05
See application file for complete search history.

(56) References Cited

U.S. PATENT DOCUMENTS

| | | |
|---|---|---|
| 3,556,126 A | 1/1971 | Oswald et al. |
| 4,285,365 A | 8/1981 | Coats et al. |
| 5,388,984 A | 2/1995 | Meslif |
| 5,918,616 A | 7/1999 | Sanfilippo et al. |
| 6,062,256 A | 5/2000 | Miller et al. |
| 6,095,175 A | 8/2000 | Miller et al. |
| 6,230,731 B1 | 5/2001 | Miller et al. |
| 6,418,954 B1 | 7/2002 | Taylor et al. |
| 6,662,817 B2 | 12/2003 | Yamagishi et al. |
| 6,752,166 B2 * | 6/2004 | Lull et al. ............ 137/9 |
| 2004/0055636 A1 * | 3/2004 | Rocha-Alvarez et al. ........ 137/9 |
| 2004/0168719 A1 | 9/2004 | Nambu |
| 2004/0187928 A1 * | 9/2004 | Ambrosina et al. ....... 137/487.5 |
| 2005/0199342 A1 * | 9/2005 | Shajii et al. ............. 156/345.26 |
| 2005/0241698 A1 | 11/2005 | Lull et al. |

* cited by examiner

*Primary Examiner* — William McCalister
(74) *Attorney, Agent, or Firm* — Moser Taboada; Alan Taboada

(57) ABSTRACT

A system and method for dividing the flow of one or more process fluids in a predetermined flow ratio is provided herein. In one embodiment, a system for dividing flow of one or more process fluids in a predetermined flow ratio includes a process chamber having a plurality of inlets for delivering one or more process fluids into the process chamber; a plurality of modulating valves coupled to the plurality of inlets, wherein each inlet of the plurality of inlets is coupled to at least one modulating valve; and a controller coupled to the plurality of modulating valves, the controller configured to control the operation of the plurality of modulating valves to divide the flow of one or more process fluids in the predetermined flow ratio.

6 Claims, 4 Drawing Sheets

SYSTEM AND METHOD TO DIVIDE FLUID FLOW IN A PREDETERMINED RATIO

BACKGROUND OF THE INVENTION

1. Field of the Invention

Embodiments of the present invention generally relate to fluid processing systems such as those in semiconductor manufacturing processes. More particularly, the invention relates to a system and method for dividing a flow of a process fluid or a mixture of process fluids in a predetermined flow ratio from a single inlet to multiple outlets.

2. Description of the Related Art

Fluid processing systems find applications in various industries, such as the semiconductor and pharmaceutical fields. In the semiconductor industry, for example, such systems are utilized in fabrication facilities where they are used to provide accurately metered quantities of fluid(s) to a substrate processing chamber. For example, such systems are typically used in processes such as chemical vapor deposition (CVD), high-density plasma chemical vapor deposition (HD-PCVD), atomic layer deposition (ALD), etching, or the like.

In a typical fabrication facility the gases used in the fluid processing systems are typically stored in cylinders or tanks, which are connected to a gas panel via piping or conduit. The fluid processing system in the fabrication facility includes gas metering units such as valves, pressure sensors, mass flow controllers (MFCs) and filters. A plurality of fluid supplies are sometimes coupled to the MFC(s) to provide an accurately metered amount of fluid to a common manifold.

Various systems, apparatus, and methods have been devised in order to divide the flow of process fluids in a desired ratio. Such systems, apparatus, and methods typically make use of multiple MFCs to accurately control the desired flow division. However, the installation, operation, and maintenance costs for each MFC is relatively high. Additionally, the control systems adapted to control multiple MFC processes are complex to build. Moreover, each MFC is typically calibrated for a specific process fluid and, thus, do not operate properly for multiple process fluids or for complex mixtures of process fluids.

There is hence a need for an improved system and method for dividing the flow of a process fluid or a mixture of process fluids in a predetermined ratio from a single inlet to multiple outlets.

SUMMARY OF THE INVENTION

The present invention generally relates to a system and method for dividing the flow of one or more process fluids in a predetermined flow ratio from a single inlet to multiple outlets. In one embodiment, a system for dividing flow of one or more process fluids in a predetermined flow ratio includes a process chamber having a plurality of inlets for delivering one or more process fluids into the process chamber; a plurality of modulating valves coupled to the plurality of inlets, wherein each inlet of the plurality of inlets is coupled to at least one modulating valve; and a controller coupled to the plurality of modulating valves, the controller configured to control the operation of the plurality of modulating valves to divide the flow of one or more process fluids in the predetermined flow ratio. Optionally, a pressure sensor may be coupled to the controller and disposed between one or more mass flow controllers and the plurality of modulating valves.

In another aspect of the invention, a method for dividing the flow of one or more process fluids in a predetermined flow ratio from a single inlet to multiple outlets is provided. In one embodiment, a method for dividing the flow of one or more process fluids in a predetermined flow ratio includes the steps of flowing one or more process fluids from one or more fluid sources to a process chamber having a plurality of inlets through a plurality of valves; and modulating the plurality of valves to divide the flow of the one or more process fluids into predetermined flow ratios between each of the plurality of inlets. Optionally, the pressure within a fluid flow line disposed between one or more mass flow controllers and the plurality of valves may be monitored, and the flow of the one or more process fluids through the plurality of valves may be adjusted in response to the monitored pressure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention provides a method and system for dividing the flow of one or more process fluids from a single inlet to multiple outlets in a predetermined flow ratio. The system may be used in fluid processing applications where a fluid is to be divided from a single inlet to multiple outlets in a desired flow ratio. In various embodiments, the invention may be used in semiconductor substrate processing.

Figure 1:
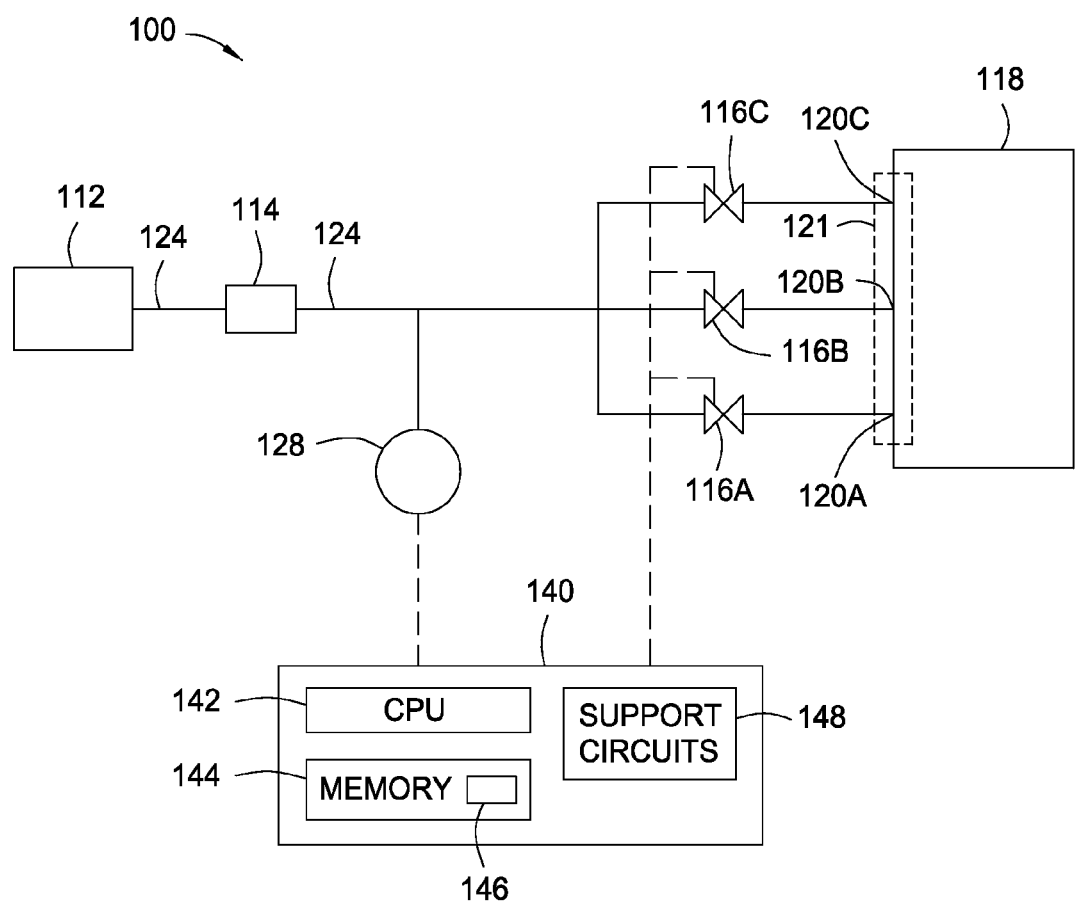
FIG. 1 is a schematic illustration of a system for dividing the flow of a process fluid in accordance with one embodiment of the present invention.

FIG. 1 is a simplified schematic illustration of a system 100 in accordance with one embodiment of the present invention. The system 100 includes a fluid source 112, a mass flow controller (MFC) 114 coupled to the fluid source 112, a plurality of modulating valves 116, a process chamber 118, and a controller 140 coupled to the plurality of modulating valves 116. The fluid communication between various components of the system 100 is provided via fluid flow lines 124.

The process chamber 118 includes a plurality of inlets 120 for introducing one or more process fluids into the process chamber 118 (three inlets 120A-C shown). The plurality of inlets 120 may include or be part of inlet ports, showerheads (e.g., 121), injection nozzles, or the like and are typically spaced about the process chamber 118 to provide a controlled distribution of the process fluid to the chamber 118 during processing. The controlled distribution may be a uniform distribution or a non-uniform distribution. For example, in one embodiment, a uniform distribution of the process fluids may be desired. Alternatively, a greater or lesser concentration of one or more process fluids may be desired in one region of the chamber, such as a central region, as compared to another region of the chamber, such as an outer region. Although three inlets 120A, 120B, and 120C are shown in the embodiment depicted in FIG. 1, it is contemplated that the process chamber 118 has at least two inlets.

The process fluids are provided by a fluid source 112 (such as a canister or other vessel, or via a fluid panel or factory fluid supply line). The process fluid can be a gas, a liquid, a slurry, or the like. The MFC 114 is coupled to the fluid source 112 and selectively meters or measures the process fluid as desired to provide a total fluid flow rate to the process chamber 118. Optionally, the MFC 114 may be a part of the fluid source 112 rather than a separate component.

The metered process fluid is delivered to the plurality of modulating valves 116 through the fluid flow lines 124. The modulating valves 116 are highly reliable valves capable of rapid cycling, for example from about 1 to about 1,000 cycles/sec or higher, and may be powered pneumatically, electrically, or by any other known method. Examples of suitable modulating valves include, for example, valves by Sundew Technologies from Broomfield, Colo. or valves as described in U.S. Pat. No. 6,818,094, issued Nov. 16, 2004 to Joseph Yudovsky and entitled, "Reciprocating Gas Valve for Pulsing a Gas," which is hereby incorporated by reference. These valves can be used in atomic layer deposition (ALD) processes and can actuate at about 50-100 cycles per second.

In operation, the valves 116 are independently cycled to control the respective valve open time, closed time, or combination for each valve in order to selectively control the relative volume of process fluid allowed to flow through the respective valve 116, thereby dividing the flow of the process fluid supplied to the chamber 118 in a controlled ratio. Typically, the period of each cycle, (i.e., the sum of the open and closed times) may be shorter than the transient response of the MFC 114 or other transients observed in the process in order to minimize perturbations in the process flow.

The reliability of the valves may be increased by minimizing the forces imparted upon the valve diaphragm, for example, by operating the valve pneumatic supply at lower pressures. Although positive shut-off may not be obtained under these conditions, the present invention utilizes the modulating valves 116 as fluid flow ratio controllers and not as shut-off devices. Alternatively, while utilizing higher valve control pressures may yield a faster response and tighter control over the valve response, the greater forces imparted upon the valve diaphragm leads to faster component wear, thereby causing increased maintenance cycles and potential process drift. Accordingly, lower valve control pressures may be utilized to obtain higher repeatability of the valve response over time, thereby minimizing process drift during operation of the system over time.

Reproducibility of the fluid flow division within the system 100 and between multiple systems may be achieved by ensuring that all of the modulating valves 116 have substantially the same response to the signal coming from the controller 140. This can be achieved for pneumatically actuated valves by minimizing and/or keeping constant the distance between the pilot valve and the modulating valve. In one embodiment, each of the modulating valves 116 has a pilot valve located on the modulating valve, for example as commercially available from Swagelok Company. Locating the pilot valve on each modulating valve 116 minimizes any lag that may be present between actuation of the pilot valve and the subsequent response by the modulating valve. The pilot valve also needs to be large enough to offer sufficient flow to actuate the pneumatic valve quickly and with repeatability. Alternatively or in combination, a precision machined orifice may be provided within each modulating valve 116 to ensure that the flow orifice of each modulating valve 116 is substantially identical.

One modulating valve 116 is provided per each inlet 120 of the process chamber 118. Although three modulating valves (116A, 116B, and 116C) are shown in the embodiment depicted in FIG. 1, it is contemplated that other numbers of valves may be utilized in other systems having different quantities of inlets. For example, a system may have a minimum of two modulating valves 116. The maximum number of modulating valves 116 is limited by the physical footprint, system complexity, operating parameters, hardware and maintenance cost, and the like.

In addition, each of the modulating valves 116 should have an equivalent flow coefficient that is lower than an equivalent flow coefficient of any other restriction in the flow path between the outlet of each MFC 114 and the inlet 120 to the process chamber 118. By ensuring that the modulating valves 116 provide the greatest flow restriction within this flow path, the respective flows and ratios of the process fluids may be more precisely controlled.

Optionally, the distance at which the plurality of modulating valves 116 are located from process chamber 118 may be selected to reduce the impact of the cycling of the modulating valves 116. Typically, the farther away the modulating valves 116 are placed from process chamber 118, the greater the diffusion of the process fluid "pulses" in the fluid flow conduits prior to entering the process chamber 118. For example, the fluid in the conduit is most dense initially following each cycle of the valve. Over time, each fluid pulse starts to expand and diffuse, until, in the final stages, the fluid pulses merge into one substantially continuous stream, producing a more uniform flow distribution of fluids. The rate at which the fluid pulses diffuse depends upon various factors such as the diffusion rate of the process fluid, the fluid flow rate, the distance from the process chamber 118, and the volume within the flow conduits.

The modulating valves 116 significantly reduce the size of the flow control system, as compared to conventional systems, thereby advantageously facilitating reduction in overall system footprint and providing greater flexibility in system design. In addition, improved temperature control of the process fluids flowing through the system 100 is facilitated due to improved physical access to the valves and the elimination of temperature sensitive electronic components near the valve.

The controller 140 typically comprises a central processing unit (CPU) 142, a memory 144, and support circuits 148. The CPU 142 may be of any form of a general-purpose computer processor used in an industrial setting. Software routines can be stored in the memory 144, such as random access memory, read only memory, floppy or hard disk, or other form of digital storage. The support circuits 148 are conventionally coupled to the CPU 142 and may comprise cache, clock circuits, input/output sub-systems, power supplies, and the like.

The software routines, when executed by the CPU 142, transform the CPU into a specific purpose computer (controller) 140 that controls the system 100 such that the processes are performed in accordance with the present invention. The software routines may also be stored and/or executed by a second controller (not shown) that is located remotely from the system 100. Although the method of the present invention is discussed as being implemented as a software routine, some of the method steps that are disclosed herein may be performed in hardware as well as by the software controller. As such, the invention may be implemented in software as executed upon a computer system, in hardware as an application specific integrated circuit (ASIC), or other type of hardware implementation, or a combination of software and hardware.

The controller 140 facilitates control of the modulating valves 116, for example, via control of pilot valves as discussed above. The controller 140 may be coupled to, or may be the same as, a controller that controls the operation of the MFC 114 and/or the process chamber 118. The controller 140 facilitates user selection of the flow ratio desired for each of the plurality of modulating valves 116. The controller 140 may provide for the control of the flow division using predetermined process recipes selected by a user or as part of a fabrication sequence. Alternatively or in combination, the controller 140 may provide for control of the flow division via manual entry of the desired flow rates, flow ratios, valve settings, or the like.

Optionally, a pressure sensor 128 may be disposed between the MFC 114 and the plurality of modulating valves 116. An output of the pressure sensor 128 is coupled to the controller 140. In operation, the pressure sensor 128 monitors the upstream pressure within the fluid flow lines 124, thereby providing feedback to compensate for upstream pressure variations and facilitating more uniform control of the total fluid flow into the process chamber 118.

Figure 2:
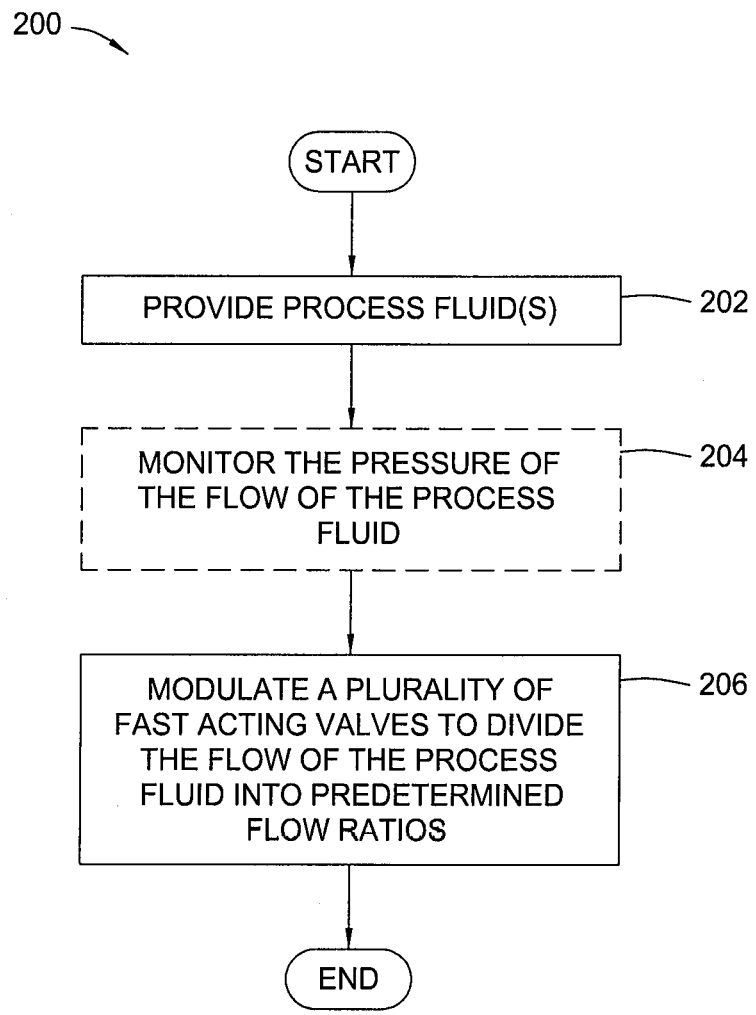
FIG. 2 is a flow chart of a method for dividing the flow of a fluid in accordance with one embodiment of the present invention.

FIG. 2 depicts a flow chart illustrating a method 200 for dividing the flow of process fluids in accordance with one embodiment of the present invention. The method 200 is described herein in conjunction with the system 100 described above with respect to FIG. 1. The method 200 begins at step 202 where a process fluid, or fluid mixture, is provided by the fluid source 112. The total flow of the process fluid may be metered as desired using the MFC 114. Optionally, at step 204, the pressure of the process fluid in the fluid flow lines 124 may be monitored using the pressure sensor 128 to provide feedback to the modulating valves 116 via the controller 140.

Next, at step 206, the plurality of modulating valves 116 are modulated using the controller 140 to divide the flow of the process fluid into the predetermined flow ratios. The controller 140, via a process recipe, a manual input, or the like, modulates the modulating valves 116 by selectively opening and closing the plurality of modulating valves 116. For example, if the predetermined flow rates desired at inlets 120A-C respectively is 1:2:3, the controller will modulate the respective modulating valves 116A-C such that the ratio of their respective duty cycles equals the desired ratio.

In the method of the present invention, the flow of the process fluid is controlled based on a volumetric flow rate method. The ratio of the respective duty cycles of the modulating valves 116 determines the volumetric flow rate of the process fluid at each of the plurality of inlets 120. In FIG. 1, for example, the respective flow ratio of a process fluid delivered to inlets 120A and 120B will be equal to the ratio of the duty cycle of modulating valve 116A to the duty cycle of modulating valve 116B, and the like. The duty cycles of the modulating valves 116 in the present invention may be set to deliver as much process fluids as possible to the process chamber 118.

Figure 3:
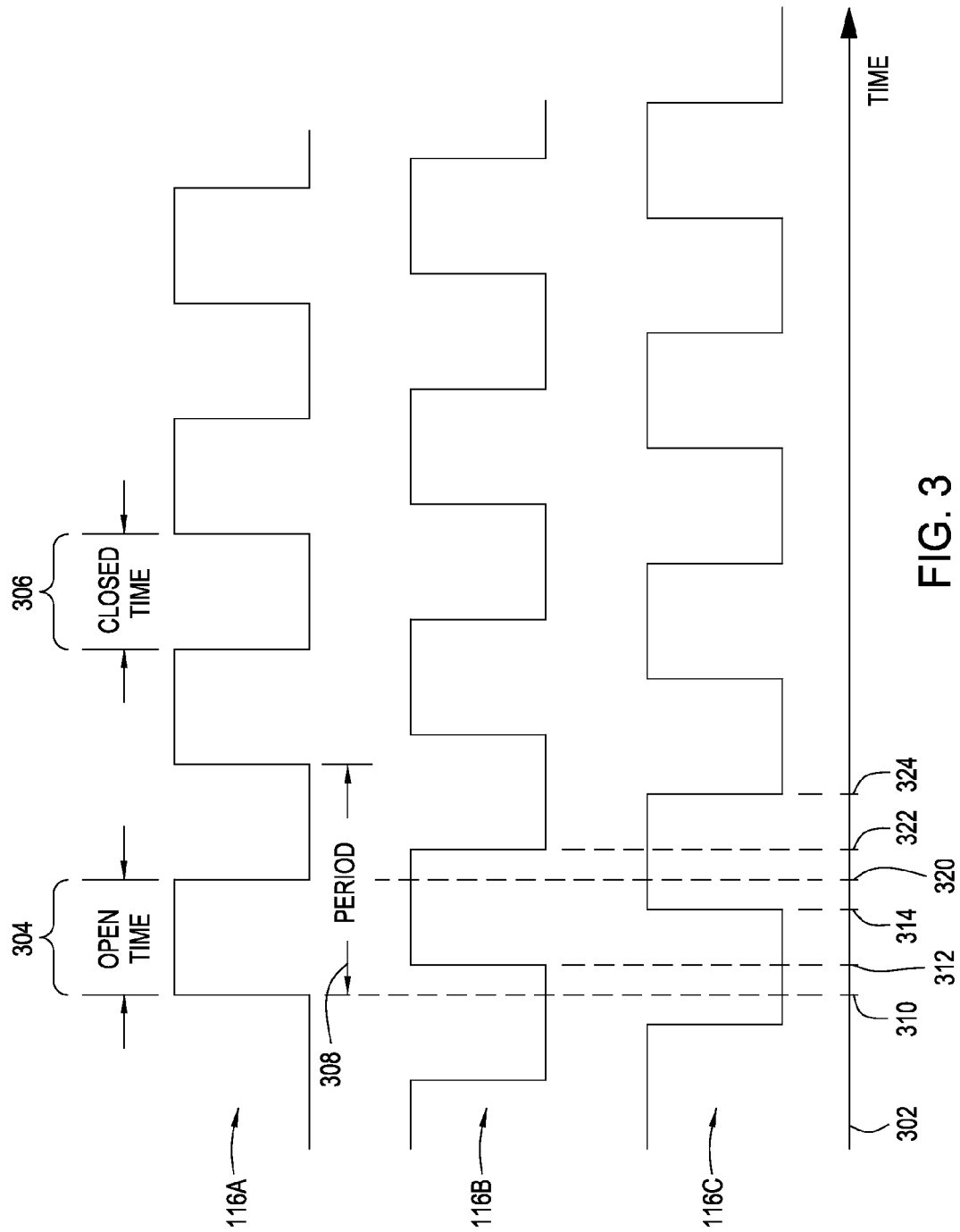
FIG. 3 is a graph illustrating the duty cycles of a plurality of modulating valves in accordance with one embodiment of the present invention.

FIG. 3 depicts a graph illustrating the duty cycles of the modulating valves 116A-C. As illustrated in FIG. 3, the open and close cycle for each valve 116A-C shown in FIG. 1 is depicted over time (axis 302). Each graph depicts an open time 304 and a closed time 306 for each valve. The sum of the open and closed times defines a period 308. The duty cycles of the modulating valves 116 may be controlled via control of the open time 304, the closed time 306, or a combination of the open and closed times. Accordingly, the ratio of the volumetric flow rates of the process fluid flowing through each of the modulating valves may be controlled independent of the frequency of modulating valve cycling. The control of the flow division independent of the valve cycling advantageously facilitates minimizing pressure perturbations within process chamber 118.

Staggering the time at which any one or more of the modulating valves 116 opens and/or closes with respect to the remaining modulating valves 116 provides the benefit of reducing impact of pressure perturbations within the process chamber 118 that may be exacerbated by multiple modulating valves 116 opening and/or closing at the same time. For example, as illustratively depicted in FIG. 3, valve 116A opens at a time 310, followed by the opening of valve 116B at a time 312. Valve 116C opens last at a time 314. Alternatively or in combination, the close times of the valves may also be staggered, as depicted by times 320, 322, and 324. Consequently, the process fluid flowing to the process chamber 118 over time is typically more accurately and smoothly distributed, thereby reducing process chamber pressure variation and increasing plasma stability. The ability to completely stagger each of the open and close times of the valves may depend upon the duty cycle required to obtain the desired fluid flow division. However, the opening and closing cycles of the valve may be varied over time to maximize the staggering benefit.

Figure 4:
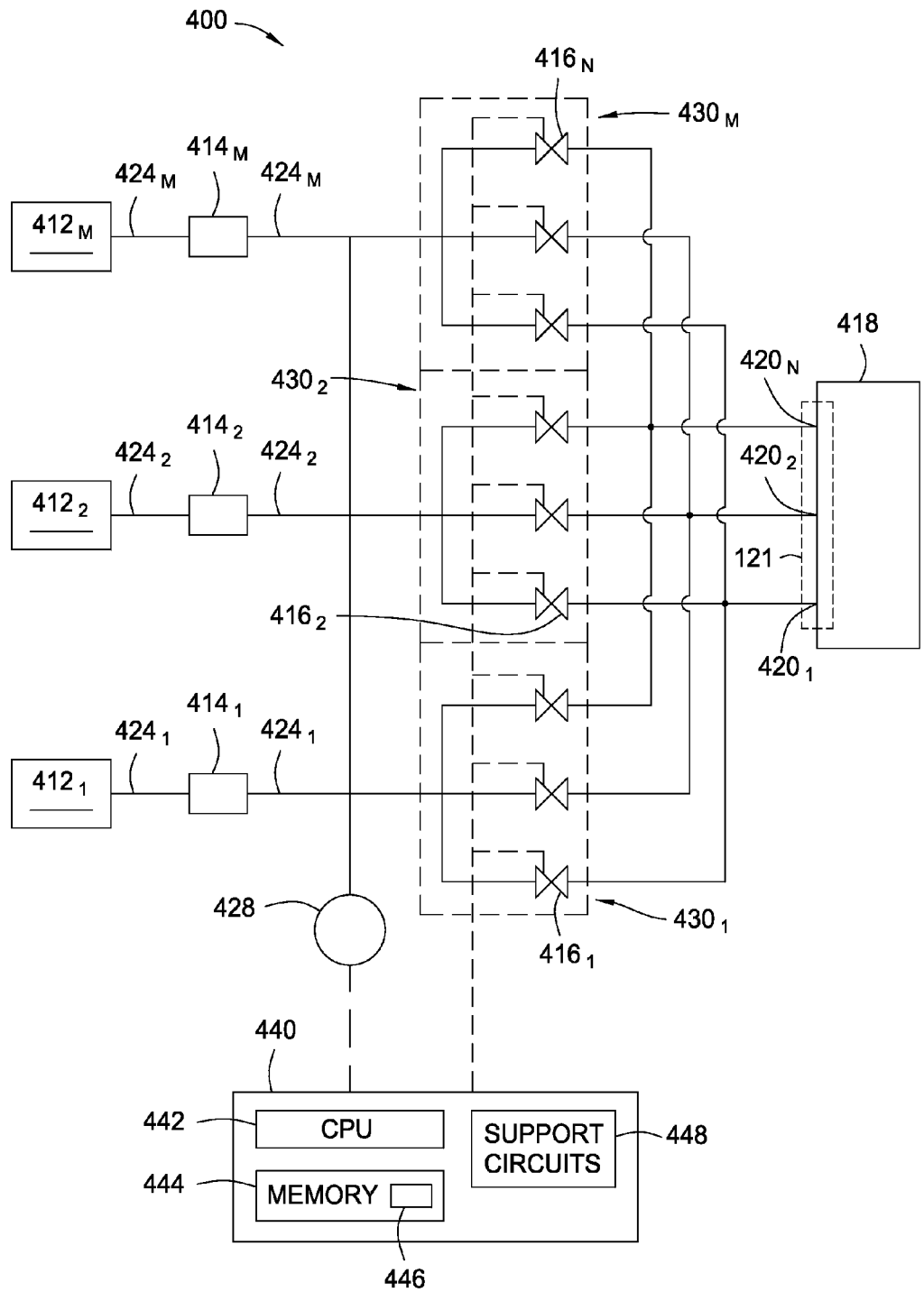
FIG. 4 is a schematic illustration of a system for dividing the flow of one or more process fluids in accordance with another embodiment of the present invention.

FIG. 4 is a simplified schematic illustration of another embodiment of a system 400 for controlling the ratio of a plurality of process fluids supplied from a plurality of fluid sources 412 (fluid sources $412_{1-M}$ shown) into a process chamber 418 having a plurality of inlets 420 (inlets $420_{1-N}$ shown). The system 400 divides the flow of the process fluids or fluid mixtures supplied by the fluid sources 412 into a predetermined flow ratio between the inlets 420. Each of the components described herein with respect to FIG. 4 correspond to the respective components described above with respect to FIG. 1 except as denoted below.

The system 400 includes a plurality of MFCs 414 (shown in FIG. 4 as MFC $414_{1-M}$) coupled to a plurality of modulating valves 416. Each MFC 414 is coupled to a respective fluid source 412 for supplying a plurality of process fluids or fluid mixtures to the process chamber 418. The independent MFCs 414 for each process fluid or fluid mixture being supplied to the process chamber 418 facilitate greater control and flexibility over the process fluid supplied to the process chamber 418. For example, different process fluids may be turned on or off or their ratios controlled or adjusted during processing or between respective processing steps. The number of MFCs 414 provided is typically equal to the number of independent fluids or fluid mixtures to be supplied to the process chamber 418.

Each MFC $414_{1-M}$ is further coupled to a respective set of modulating valves $430_{1-M}$ via a corresponding fluid flow line $424_{1-M}$. Accordingly, each set of modulating valves $430_{1-M}$ corresponds to a respective fluid supply $412_{1-M}$ and controls the fluid flow ratio of the particular process fluid being supplied to the process chamber 418. Each set of modulating valves $430_{1-M}$ includes a plurality of modulating valves $416_{1-N}$ that are respectively coupled to the plurality of inlets $420_{1-N}$ of the process chamber 418. The number of modulating valves 416 in each set of modulating valves 430 corresponds to the number of inlets 420 of the process chamber 418. Thus, each set of modulating valves 430 independently divides the process fluid metered by the corresponding MFC 414 into a predetermined flow ratio at the inlets $420_{1-N}$ of the process chamber 418. Thus, the system 400 advantageously facilitates independent control of the flow ratio of each process fluid being supplied to the process chamber 418 via the plurality of inlets $420_{1-N}$.

A controller 440, similar to the controller 140 described above with respect to FIG. 1, is configured to control the state and operation of the plurality of modulating valves 416 to divide the flow of the plurality of process fluids in a predetermined flow ratio.

The system 400 may optionally include a pressure sensor 428 coupled to the controller 122 and disposed between at least one of the plurality of MFCs 414 and the set of modulating valves 430. Alternatively, multiple pressure sensors 428 may be used such that one pressure sensor 428 is disposed between each MFC 114 and corresponding set of modulating valves 430. The pressure sensor 428 is utilized in the same fashion as the pressure sensor 128 described above with respect to FIG. 1.

Thus, a system and method for providing one or more process fluids to a process chamber having a plurality of inlets in a controlled flow ratio is provided herein. The inventive system and method provide control over fluid flows to a process chamber using fewer expensive components than prior art systems, thereby providing cost savings due to reduction in capital, equipment, operational, and maintenance costs. The present invention further facilitates reducing the footprint of the system and facilitates new process chamber designs. The use of volumetric flow rate instead of mass flow rate also simplifies the process chamber design and increases flexibility in terms of flow rates, number of process chamber inlets, available flow ratios, and the like.

While the foregoing is directed to embodiments of the present invention, other and further embodiments of the invention may be devised without departing from the basic scope thereof, and the scope thereof is determined by the claims that follow.

The invention claimed is:

1. A system for dividing flow of a process fluid in a predetermined flow ratio, the system comprising:
   a plurality of fluid sources for providing a plurality of process fluids;
   a plurality of mass flow controllers, wherein each mass flow controller of the plurality of mass flow controllers is coupled to a corresponding fluid source of the plurality of fluid sources;
   a plurality of sets of modulating valves, wherein each set of modulating valves comprises a plurality of modulating valves, and wherein each set of modulating valves is coupled to a corresponding mass flow controller of the plurality of mass flow controllers;
   a process chamber having a central region and an outer region and a plurality of inlets for delivering each process fluid of the plurality of process fluids at the predetermined flow ratio between the central region and the outer region, wherein each inlet is coupled to a respective one modulating valve from each set of modulating valves; and
   a controller coupled to the plurality of sets of modulating valves, the controller configured to control the duty cycle of respective valves in the plurality of sets of modulating valves to divide the flow of each process fluid of the plurality of process fluids in the predetermined flow ratio between the central region and the outer region and to independently control a composition of the plurality of process fluids delivered through each inlet.

2. The system of claim 1, further comprising:
   a plurality of pressure sensors, each pressure sensor coupled to the controller and disposed between each mass flow controller and a corresponding set of modulating valves.

3. The system of claim 1, wherein the controller is configured to modulate the valves in each set of modulating valves to control the volumetric flow rate of each process fluid flowing into the process chamber through each of the plurality of inlets.

4. A method for dividing flow of a process fluid in a predetermined flow ratio, the method comprising:
   flowing a plurality of fluids from a respective plurality of fluid sources through a plurality of sets of valves to form the process fluid and to provide the process fluid to a central region and an outer region of a process chamber having a plurality of inlets coupled to the central region and the outer region of the process chamber, wherein each set of valves comprises a plurality of valves, wherein each valve in the plurality of valves of each set is respectively coupled to a corresponding inlet of the plurality of inlets and wherein each set is respectively coupled to one of the plurality of fluid sources;
   metering each fluid of the process fluid by a plurality of mass flow controllers coupled between the plurality of fluid sources and the plurality of sets of valves; and
   modulating the plurality of valves in each set to independently control a composition of the process fluid delivered through each inlet and to divide the flow of the process fluid into the predetermined flow ratio between the central region and the outer region, wherein the plurality of valves are modulated by a controller that controls the duty cycle of the modulating valves.

5. The method of claim 4, further comprising:
   monitoring the pressure within a fluid flow line disposed between a mass flow controller of the plurality of mass flow controllers and a set of valves of the plurality of sets of valves; and
   adjusting the flow of a fluid provided by the mass flow controller through the set of valves using the monitored pressure.

6. The method of claim 5, wherein the flow of the fluid is controlled based upon volumetric flow rates.

* * * * *